United States Patent
Jung et al.

(10) Patent No.: US 7,691,432 B2
(45) Date of Patent: Apr. 6, 2010

(54) DISPENSER FOR LIQUID CRYSTAL DISPLAY PANEL AND METHOD FOR DETECTING RESIDUAL QUANTITY OF DISPENSING MATERIAL USING THE SAME

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 956 days.

(21) Appl. No.: 10/699,845

(22) Filed: Nov. 4, 2003

(65) Prior Publication Data
US 2004/0091621 A1    May 13, 2004

(30) Foreign Application Priority Data
Nov. 13, 2002    (KR)    ........................ 10-2002-0070487

(51) Int. Cl.
*B05D 5/06*    (2006.01)
*C23C 16/52*    (2006.01)
(52) U.S. Cl. .............................. 427/58; 427/8; 427/256; 427/421.1
(58) Field of Classification Search ...................... 427/8, 427/68, 256, 58, 421.1
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,277,333 A * | 1/1994 | Shimano ........................ 222/14 |
| 5,379,139 A | 1/1995 | Sato et al. |
| 5,406,989 A | 4/1995 | Abe |
| 5,499,128 A | 3/1996 | Hasegawa et al. |

(Continued)

FOREIGN PATENT DOCUMENTS

EP    1 003 066    5/2000

(Continued)

OTHER PUBLICATIONS

Abstract and computer translation of JP 2001-356353 of Hachiman et al. published Dec. 26, 2001.*

Primary Examiner—Timothy H Meeks
Assistant Examiner—Jimmy Lin
(74) Attorney, Agent, or Firm—McKenna Long & Aldridge LLP

(57) ABSTRACT

A dispenser for a liquid crystal display panel includes a syringe for applying a dispensing material to a substrate through a nozzle provided at one end portion thereof, a cap unit provided at the other end portion of the syringe, a gas supply unit for supplying a gas to the syringe through a gas pipe penetrating the cap unit, a valve provided in the gas pipe, a detecting unit for detecting a residual quantity of the dispensing material remaining in the syringe through a flow amount of gas supplied from the gas supply unit to the syringe and a controller for controlling the gas supply unit, the valve and the detecting unit.

1 Claim, 4 Drawing Sheets

U.S. PATENT DOCUMENTS

| | | | |
|---|---|---|---|
| 5,507,323 | A | 4/1996 | Abe |
| 5,511,591 | A | 4/1996 | Abe |
| 5,539,545 | A | 7/1996 | Shimizu et al. |
| 5,548,429 | A | 8/1996 | Tsujita |
| 5,642,214 | A | 6/1997 | Ishii et al. |
| 5,680,189 | A | 10/1997 | Shimizu et al. |
| 5,742,370 | A | 4/1998 | Kim et al. |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 2001/0013920 | A1* | 8/2001 | Hashimoto et al. .......... 349/187 |
| 2001/0021000 | A1 | 9/2001 | Egami |
| 2002/0008794 | A1* | 1/2002 | Song et al. .................... 349/40 |
| 2003/0020845 | A1* | 1/2003 | Lee et al. ...................... 349/40 |
| 2003/0083203 | A1* | 5/2003 | Hashimoto et al. .......... 505/100 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 64-059823 | 3/1989 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 05-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 08-190099 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-099760 | 4/1998 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-296168 | 11/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-296354 | 10/2000 |
| JP | 2000-310759 | 11/2000 |
| JP | 2000-310784 | 11/2000 |
| JP | 2000-338501 | 12/2000 |
| JP | 2001-5401 | 1/2001 |

| | | | | | |
|---|---|---|---|---|---|
| JP | 2001-5405 | 1/2001 | JP | 2002-90759 | 3/2002 |
| JP | 2001-13506 | 1/2001 | JP | 2002-90760 | 3/2002 |
| JP | 2001-33793 | 2/2001 | JP | 2002-107740 | 4/2002 |
| JP | 2001-42341 | 2/2001 | JP | 2002-122870 | 4/2002 |
| JP | 2001-51284 | 2/2001 | JP | 2002-122872 | 4/2002 |
| JP | 2001-66615 | 3/2001 | JP | 2002-122873 | 4/2002 |
| JP | 2001-91727 | 4/2001 | JP | 2002-131762 | 5/2002 |
| JP | 2001-117105 | 4/2001 | JP | 2002-139734 | 5/2002 |
| JP | 2001-117109 | 4/2001 | JP | 2002-156518 | 5/2002 |
| JP | 2001-133745 | 5/2001 | JP | 2002-169166 | 6/2002 |
| JP | 2001-133794 | 5/2001 | JP | 2002-169167 | 6/2002 |
| JP | 2001-133799 | 5/2001 | JP | 2002-182222 | 6/2002 |
| JP | 2001-142074 | 5/2001 | JP | 2002-202512 | 7/2002 |
| JP | 2001-147437 | 5/2001 | JP | 2002-202514 | 7/2002 |
| JP | 2001-154211 | 6/2001 | JP | 2002-214626 | 7/2002 |
| JP | 2001-166272 | 6/2001 | JP | 2002-229042 | 8/2002 |
| JP | 2001-166310 | 6/2001 | JP | 2002-236276 | 8/2002 |
| JP | 2001-183683 | 7/2001 | JP | 2002-258299 | 8/2002 |
| JP | 2001-201750 | 7/2001 | JP | 2002-236292 | 9/2002 |
| JP | 2001-209052 | 8/2001 | JP | 2002-277865 | 9/2002 |
| JP | 2001-209056 | 8/2001 | JP | 2002-277866 | 9/2002 |
| JP | 2001-209057 | 8/2001 | JP | 2002-277881 | 9/2002 |
| JP | 2001-209058 | 8/2001 | JP | 2002-287156 | 10/2002 |
| JP | 2001-209060 | 8/2001 | JP | 2002-296605 | 10/2002 |
| JP | 2001-215459 | 8/2001 | JP | 2002-311438 | 10/2002 |
| JP | 2001-222017 | 8/2001 | JP | 2002-311440 | 10/2002 |
| JP | 2001-235758 | 8/2001 | JP | 2002-311442 | 10/2002 |
| JP | 2001-255542 | 9/2001 | JP | 2002-323687 | 11/2002 |
| JP | 2001-264782 | 9/2001 | JP | 2002-323694 | 11/2002 |
| JP | 2001-272640 | 10/2001 | JP | 2002-333628 | 11/2002 |
| JP | 2001-281675 | 10/2001 | JP | 2002-333635 | 11/2002 |
| JP | 2001-281678 | 10/2001 | JP | 2002-333843 | 11/2002 |
| JP | 2001-282126 | 10/2001 | JP | 2002-341329 | 11/2002 |
| JP | 2001-305563 | 10/2001 | JP | 2002-341355 | 11/2002 |
| JP | 2001-330837 | 11/2001 | JP | 2002-341356 | 11/2002 |
| JP | 2001-330840 | 11/2001 | JP | 2002-341357 | 11/2002 |
| JP | 2001-356353 | 12/2001 | JP | 2002-341358 | 11/2002 |
| JP | 2001-356354 | 12/2001 | JP | 2002-341359 | 11/2002 |
| JP | 2002-14360 | 1/2002 | JP | 2002-341362 | 11/2002 |
| JP | 2002-23176 | 1/2002 | JP | 2002-080321 | 3/2003 |
| JP | 2002-49045 | 2/2002 | KR | 2000-0035302 | 6/2000 |
| JP | 2002-079160 | 3/2002 | | | |
| JP | 2002-82340 | 3/2002 | | | |

* cited by examiner

DISPENSER FOR LIQUID CRYSTAL DISPLAY PANEL AND METHOD FOR DETECTING RESIDUAL QUANTITY OF DISPENSING MATERIAL USING THE SAME

This application claims the benefit of the Korean Application No. P2002-070487 filed in Korea on Nov. 13, 2002, which is hereby incorporated by reference.

BACKGROUND OF THE INVENTION

1. Field of the Invention

The present invention relates to a dispenser for a liquid crystal display panel and a method for detecting a residual quantity of a dispensing material using the dispenser, and more particularly, to a dispenser for a liquid crystal display panel and a method for detecting a residual quantity of a dispensing material using the dispenser that are capable of accurately detecting a residual quantity of a dispensing material and removing a defect occurrence factor of a liquid crystal display panel.

2. Discussion of the Related Art

In general, a liquid crystal display is a display device where data signals that correspond to picture information are individually supplied to liquid crystal cells arranged in a matrix form. The light transmittance of each of the liquid crystal cells is controlled to display a desired picture. The liquid crystal display device includes a liquid crystal display panel having liquid crystal cells arranged in a matrix form and a driver integrated circuit (IC) for driving the liquid crystal cells. The liquid crystal display panel also has a color filter substrate and a thin film transistor array substrate that face each other with a liquid crystal layer positioned between the color filter substrate and the thin film transistor array substrate.

Data lines and gate lines are formed on the thin film transistor array substrate of the liquid crystal display panel. These lines cross at right angles to thereby define liquid crystal cells adjacent to each of the crossings. The data lines transmit a data signal supplied from the data driver integrated circuit to the liquid crystal cells. The gate lines transmit a scan signal supplied from the gate driver integrated circuit to the liquid crystal cells. The gate driver integrated circuit sequentially supplies scan signals to the gate lines so that the liquid crystal cells arranged in the matrix form can be sequentially selected line by line. A data signal is supplied to the selected one line of liquid crystal cells from the data driver integrated circuit.

A common electrode and a pixel electrode are respectively formed on the inner side of the color filter substrate and the thin film transistor array substrate. An electric field is applied across the liquid crystal layer via a common electrode and a pixel electrode. More specifically, a pixel electrode is formed in each liquid crystal cell on the thin film transistor array substrate. The common electrode is integrally formed across the entire surface of the color filter substrate. Therefore, by controlling a voltage applied to the pixel electrode when a voltage is applied to the common electrode, light transmittance of the liquid crystal cells can be individually controlled. To control the voltage applied to the pixel electrode by liquid crystal cells, a thin film transistor used as a switching device is formed in each liquid crystal cell. Elements of the liquid crystal display device will now be described.

FIG. 1 is a plan view of the unit liquid crystal display panel formed by a thin film transistor array substrate and a color filter substrate according to the related art. As shown in FIG. 1, the liquid crystal display panel 100 includes an image display part 113 where the liquid crystal cells are arranged in a matrix form, a gate pad part 114 connected to the gate lines of the image display part 113, and a data pad part 115 connected to the data lines. The gate pad part 114 and the data pad part 115 are formed along an edge region of the thin film transistor array substrate 101 that does not overlap with the color filter substrate 102. The gate pad part 114 supplies a scan signal from the gate driver integrated circuit to the gate lines of the image display part 113, and the data pad part 115 supplies image information from the data driver integrated circuit to the data lines of the image display part 113.

Data lines to which image information is applied and gate lines to which a scan signal is applied are provided on the thin film transistor array substrate 101. The data lines and the gate lines intersect each other. Additionally, a thin film transistor for switching the liquid crystal cells is provided at each intersection of the data lines and the gate lines. A pixel electrode for driving the liquid crystal cells connected to the thin film transistor is provided on the thin film transistor array substrate 101, and a passivation film protecting the pixel electrode and the thin film transistor is formed on the entire surface of the thin film transistor array substrate 101.

Color filters in the cell regions are separated by the black matrix. A common transparent electrode is provided on the color filter substrate 102. A cell gap is formed by a spacer between the thin film transistor array substrate 101 and the color filter substrate 102, which are attached to each other by a seal pattern 116 formed along an outer edge of the image display part 113.

In fabricating the liquid crystal display panel, a method for simultaneously forming a multiple liquid crystal display panels on a large-scale mother substrate is typically used. Thus, this method requires a process for separating the liquid crystal display panels from the large-scale mother substrate by cutting and processing the mother substrate having the plurality of liquid crystal display panels formed thereon. After a liquid crystal display panel is separated from the large-scale mother substrate, liquid crystal is injected through a liquid crystal injection opening to form a liquid crystal layer in the cell-gap which separates the thin film transistor array substrate 101 and the color filter substrate 102, and then the liquid crystal injection opening is sealed.

To fabricate a liquid crystal display panel, the following processes are generally required. First, the thin film transistor array substrate 101 and the color filter substrate 102 are separately fabricated on first and second mother substrates. The first and second mother substrates are attached in such a manner that a uniform cell-gap is maintained therebetween. The attached first and second mother substrates are cut into unit panels. Then, liquid crystal is injected to the cell-gap between the thin film transistor array substrate 101 and the color filter substrate 102. A process of forming the seal pattern 116 along an outer edge of the image display part 113 is required to attach the thin film transistor array substrate 101 and the color filter substrate 102. The related art seal pattern forming method will now be described.

FIGS. 2A and 2B illustrate a screen printing method to form a seal pattern. As shown in FIGS. 2A and 2B, there are provided a screen mask 206 patterned so that a seal pattern forming region is selectively exposed. Then, a rubber squeegee 208 for selectively supplying a sealant 203 to the substrate 200 through the screen mask 206 is used to form the seal pattern 216. Thus, the seal pattern 216 is formed along an outer edge of the image display part 213 of the substrate 200 and a liquid crystal injection opening is formed at one side. The opening is for injecting liquid crystal into a gap between the thin film transistor array substrate 101 and the color filter substrate 102. The seal pattern 216 prevents the leakage of the liquid crystal. In general, the screen printing method includes: applying the sealant 203 on the screen mask 206 having a seal pattern forming region patterned thereon, and forming the seal pattern 216 on the substrate 200 through printing with the rubber squeegee 208; and drying the seal pattern 216 by evaporating a solvent contained in the seal pattern 216 and leveling it.

The screen printing method is widely used because it has the advantage of processing ease. However, it has the disadvantage of sealant waste. More particularly, sealant is wasted because sealant is applied to the entire surface of the screen mask and then the seal pattern is printed with the rubber squeegee such that the excess sealant material, which is not printed, is thrown away. In addition, the screen printing method has another disadvantage in that a rubbed orientation film (not shown) formed on the substrate 200 is degraded as a result of the screen mask 206 being brought into contact with the substrate 200. The degradation of the rubbed orientation film degrades picture quality of the liquid crystal display device. Therefore, to overcome the shortcomings of the screen printing method, a seal dispensing method has been proposed.

FIG. 3 is an exemplary view of a dispensing method for forming a seal pattern in accordance with the related art. As shown in FIG. 3, while a table 310 with the substrate 300 loaded thereon is being moved in the forward/backward and left/right directions. A seal pattern 316 is formed along an outer edge of the image display part 313 of the substrate 300 by applying a certain pressure to sealant in the syringe 301. In this seal dispensing method, since the sealant is selectively supplied to the region where the seal pattern 316 is to be formed, sealant consumption can be reduced. In addition, since the syringe is not in contact with the orientation film (not shown) of the image display part 313 of the substrate 300, the rubbed orientation film can not be damaged and thus the picture quality of the liquid crystal display device is not degraded.

In the case of forming the seal pattern 316 on the substrate 300 loaded on the table 310 by using the syringe 301, a technique is required to detect precisely the residual quantity of sealant that remains in the syringe 301. That is, if the sealant filled in the syringe 301 is used up, the seal pattern 316 may not be completely formed on the substrate 300, or in a worse case, the seal pattern 316 is not even formed on the substrate 300, generating a defective liquid crystal display panel. Therefore, an operator should be notified when a residual quantity of the sealant remaining in the syringe 301 is not sufficient such that the syringe 301 can be replaced with a different syringe 301 filled with sealant before the residual quantity reaches such a minimum quantity that will not form a proper seal pattern 316.

In the related art, the operator detects an initial charge quantity of the sealant filled in the syringe 301 and calculates a consumed quantity of the sealant by calculating a length of the seal pattern 316 during its formation to thereby estimate a residual quantity of the sealant remaining in the syringe 301. However, the related art of a method for detecting a residual quantity of sealant based on the arithmetic distance calculation has a problem in that operators make errors in detecting or noting the initial charge quantity. In addition, the residual quantity of sealant estimated by the arithmetic length calculation may differ from an actual residual quantity of sealant remaining in the syringe 301. That is, even through the seal pattern 316 is formed with the same length on the substrate 300, the consumed quantity of sealant may differ depending on a width and a height of the seal pattern 316, resulting in the residual quantity of sealant determined by the arithmetic length calculation being different from an actual residual quantity of sealant remaining in the syringe 301. Thus, even if the syringe 301 has enough sealant, it may be replaced with another syringe 301 filled with sealant, which wastes sealant and thus increases material expense. Conversely, even though the syringe 301 does not have enough sealant, the syringe 301 may still be used to form the seal pattern 316. Then, the seal pattern 316 may be partially formed, or in a worse case, no seal pattern is formed causing a defective liquid crystal display panel and degradation of a productivity.

SUMMARY OF THE INVENTION

Therefore, an object of the present invention is to provide a dispenser for a liquid crystal display panel and a method for detecting a residual quantity of a dispensing material using the dispenser that are capable of accurately detecting an actual residual quantity of a dispensing material remaining in a syringe to thereby prevent the occurrence of defects in the liquid crystal display panel.

To achieve these and other advantages and in accordance with the purpose of the present invention, as embodied and broadly described herein, there is provided a dispenser for a liquid crystal display including a syringe for applying a dispensing material to a substrate through a nozzle provided at one end portion thereof, a cap unit provided at the other end portion of the syringe, a gas supply unit for supplying a gas to the syringe through a gas pipe penetrating the cap unit, a valve provided in the gas pipe, a detecting unit for detecting a residual quantity of the dispensing material remaining in the syringe through a flow amount of gas supplied from the gas supply unit to the syringe and a controller for controlling the gas supply unit, the valve and the detecting unit.

In another aspect, a method for detecting a residual quantity of a dispensing material using a dispenser of a liquid crystal display panel includes supplying a gas to syringe filled with the dispensing material and detecting a first flow amount of gas, determining a second flow amount of gas based upon the first flow amount of gas and the volume of the syringe, repeatedly performing dispensings through the syringe filled with the dispensing material by supplying a intermediate flow amount of gas to the syringe, and comparing a sum of intermediate flow amounts with the second flow amount of gas to determine a residual quantity of the dispensing material remaining in the syringe.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
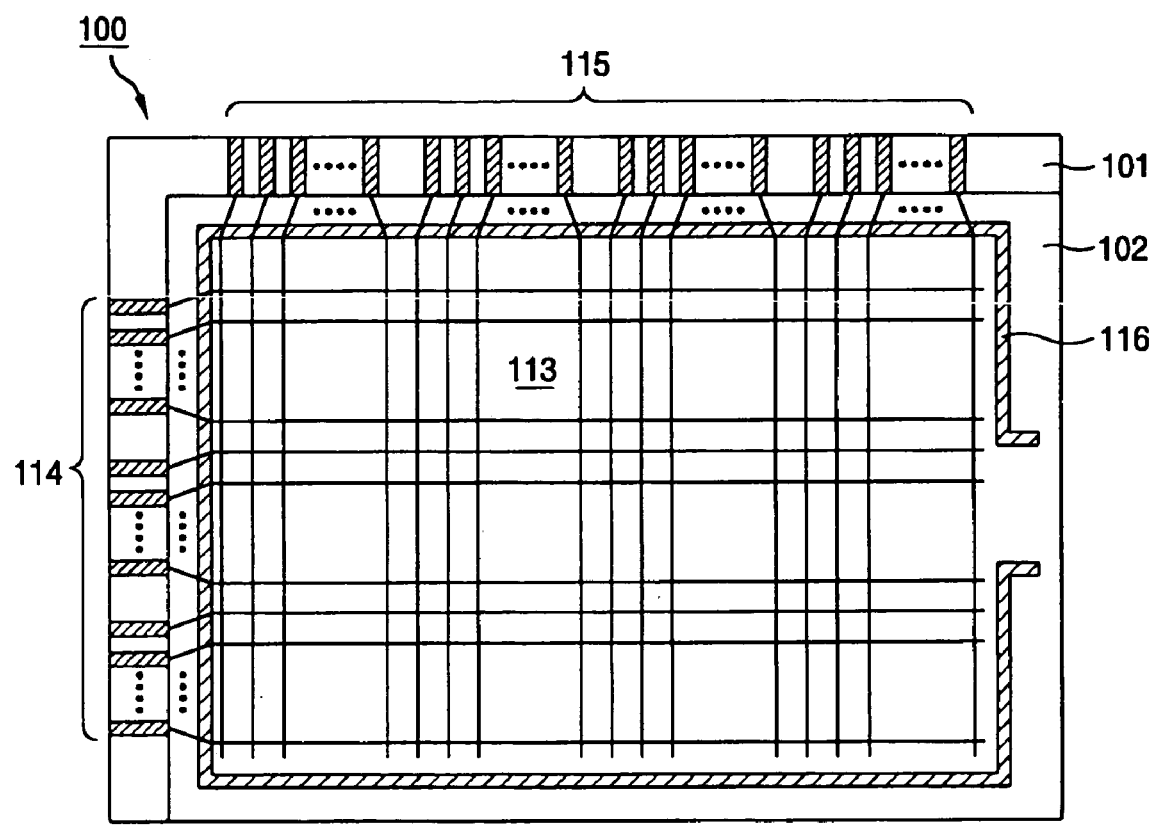
FIG. 1 is a plan view of the unit liquid crystal display panel formed by a thin film transistor array substrate and a color filter substrate according to the related art.
Figure 2A:
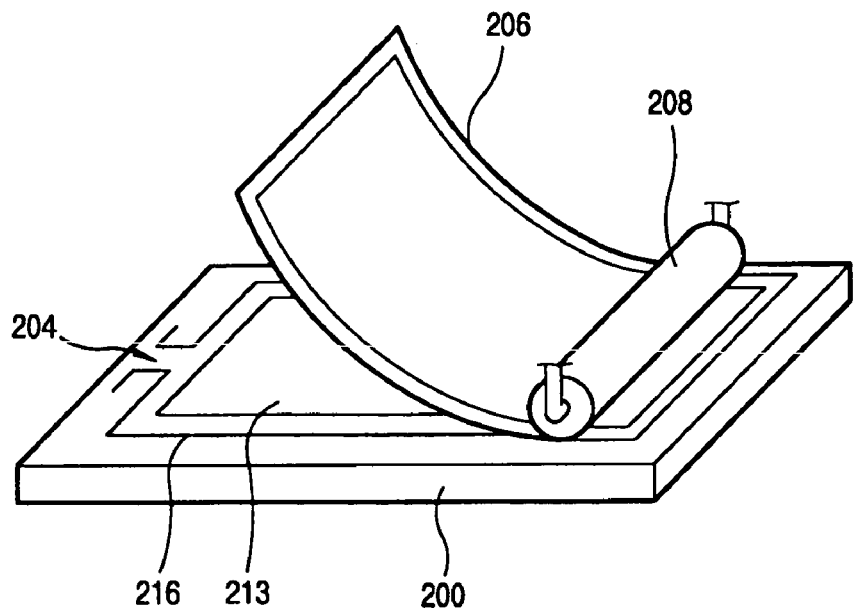
FIGS. 2A and 2B illustrate formation of a seal pattern through a screen printing method in accordance with the related art.
Figure 2B:
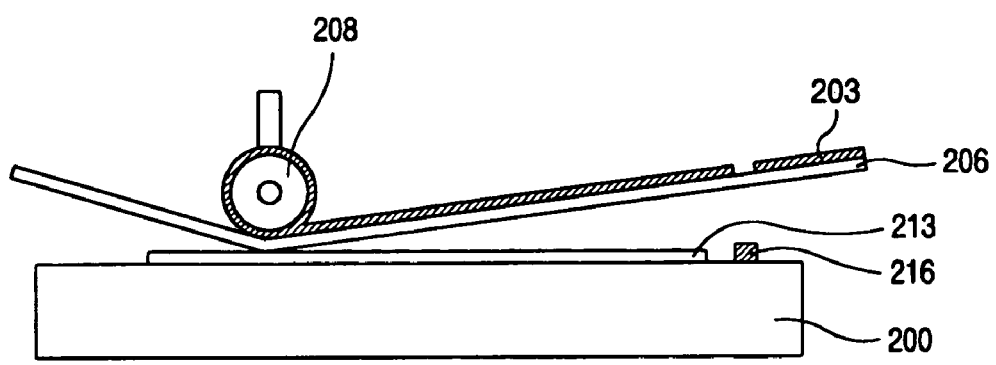
Figure 3:
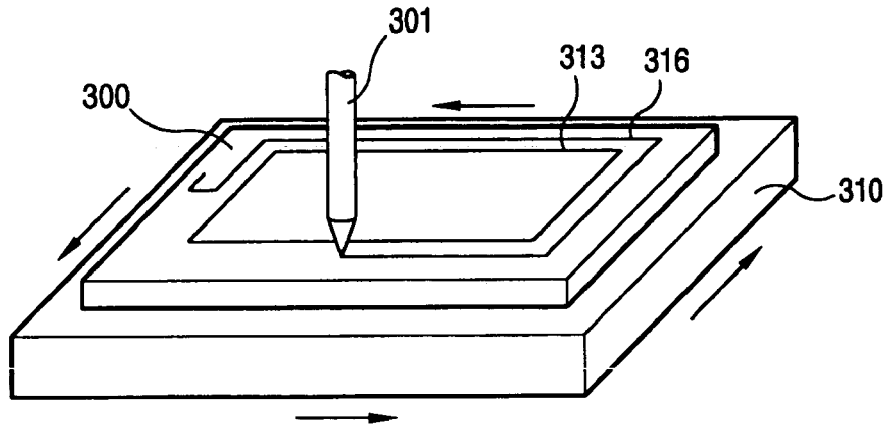
FIG. 3 illustrates formation of a seal pattern through a seal dispensing method in accordance with the related art.
Figure 4:
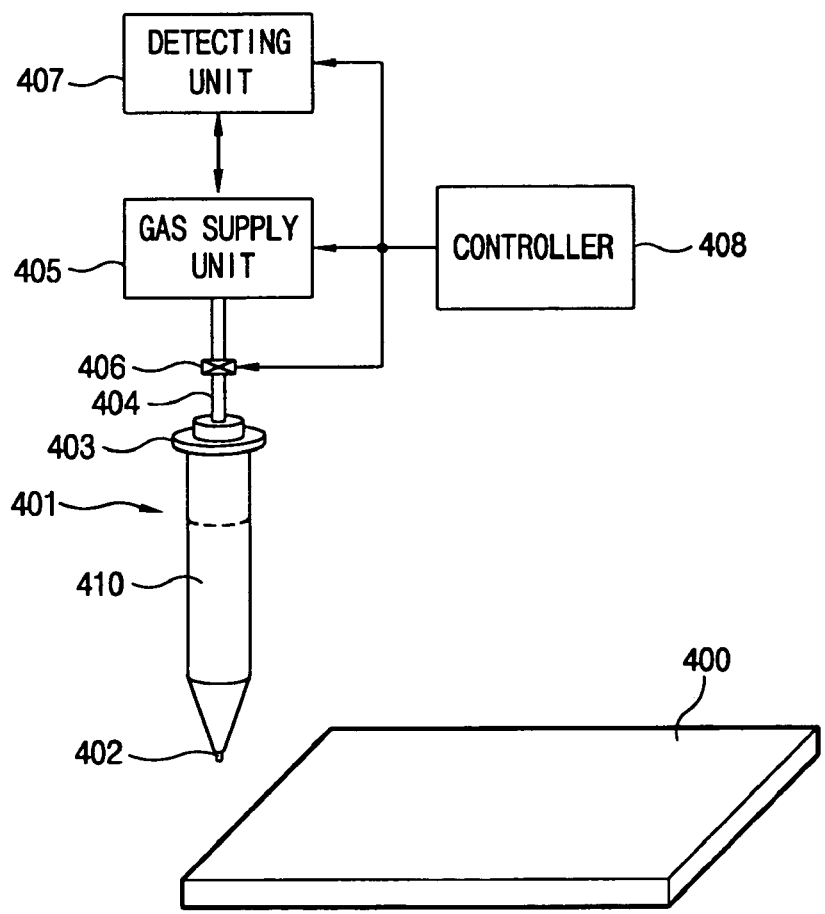
FIG. 4 illustrates a dispenser for a liquid crystal display panel in accordance with a present invention.

FIG. 4 illustrates a dispenser for a liquid crystal display panel in accordance with one embodiment of the present invention. As shown in FIG. 4, a dispenser for a liquid crystal display panel includes a syringe 401 for applying a dispensing material 410 to a substrate 400 through a nozzle 402 provided at one end thereof. A cap unit 403 provided at the other end of the syringe 401. The dispenser for a liquid crystal display panel also includes a gas supply unit 405 for supplying a gas to the syringe 401 through a gas pipe 404 penetrating the cap unit 403, a valve 406 provided at the gas pipe 404, a detecting unit 407 for detecting a residual quantity of the dispensing material 410 remaining in the syringe 401 through a flow amount of gas supplied from the gas supply unit 405 to the syringe 401, and a controller 408. The gas supply unit 405, the valve 406 and the detecting unit 407 are controlled by the controller 408.

Figure 5:
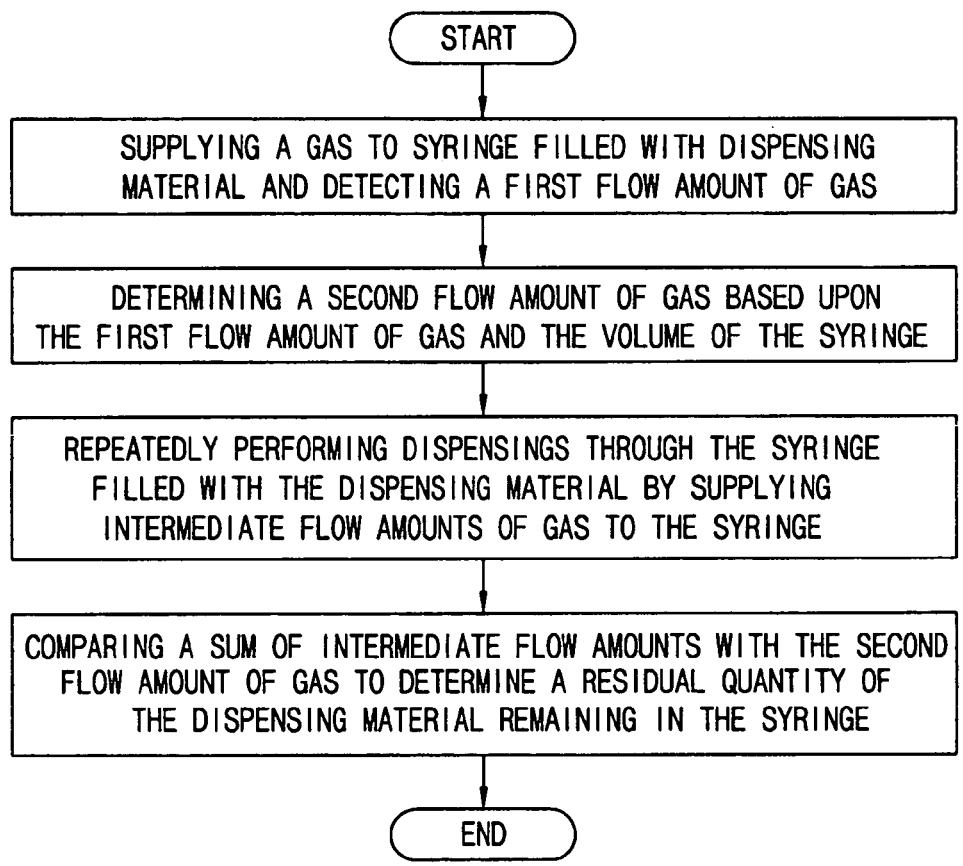
FIG. 5 is a flow chart of a method for detecting a residual quantity of a dispensing material using the dispenser for a liquid crystal display panel of FIG. 4.

FIG. 5 is a flow chart of a method for detecting a residual quantity of a dispensing material using the dispenser for a liquid crystal display panel of FIG. 4. As shown in FIG. 5, a method for detecting a residual quantity of a dispensing material using the dispenser for a liquid crystal display panel in accordance with one embodiment of the present invention includes: supplying a gas to the syringe 401 filled with the dispensing material 410 and detecting a first flow amount of gas; determining a second flow amount of gas based upon the first flow amount of gas and the volume of the syringe 401; performing a dispensing through the syringe 401 filled with the dispensing material 410 by supplying intermediate flow amounts of gas to the syringe 401; and comparing the sum of intermediate flow amounts with the second flow amount to determine a residual quantity of the dispensing material 410 remaining in the syringe 401 such that only minimum quantity of dispensing material 410 remains to ensures the previous dispensing but not enough for a subsequent dispensing. The dispenser and the method for detecting a residual quantity of a dispensing material using the dispenser will now be described in detail.

First, a gas is supplied to the syringe 401 filled with the dispensing material 410 through the gas supply unit 405 and the detecting unit 407 detects a first flow amount of gas necessary for the syringe 401 to be capable of dispensing sealant in response to an additional volume of gas. The first flow amount of gas prepares the syringe for the first dispensing. A second flow amount of gas can be determined by subtracting the first flow amount of gas and a minimum dispensing value from the known volume of the syringe 401. The minimum dispensing value is a volume of the minimum quantity of dispensing material that is left when the syringe is empty. The minimum quantity of dispensing material should enough dispensing material 410 to ensure that the previous dispensing was sufficient but not enough for a subsequent dispensing. The second flow amount of gas is then supplied to the syringe 401 through the gas supply unit 405 over the course of several dispensing operations using intermediate flow amounts. The detecting unit 407 detects the intermediate amounts of gas and determines the sum of intermediate amounts of gas up to the second flow amount of gas. The gas supplied to the syringe 401 through the gas supply unit 405 is a gas having a low reactivity with the dispensing material 410, for example, nitrogen ($N_2$). The states of the first and second flow amounts determined using the detecting unit 407 respectively refer to a state in which the syringe 401 is full of dispensing material 410 ready for dispensing and a state in which a minimum quantity of dispensing material 410 remains in the syringe 401. Accordingly, if a detected flow amount of gas is in the range between the first flow amount and a sum of the first and second flow amounts, dispensing can still be performed on the substrate 400 using the syringe 401.

As mentioned above, the dispensing material 410 is dispensed by supplying a gas to the syringe 401 filled with the sealant material 410 through the gas supply unit 405 to thereby perform a dispensing onto the substrate 400. The volume of gas supplied through the gas supply unit 405 to the syringe, which is the intermediate flow amount of gas, corresponds to the volume of dispensing material 410 consumed during the dispensing. The detecting unit 407 detects the intermediate flow amounts of gas during each of the dispensings. Inside the syringe 401, the change in the volume of the space, which is not filled with the dispensing material 410, corresponds to the volume of sealant material that has been dispensed from the syringe 401. Thus, the sum of the intermediate flow amounts through the gas supply unit 405 after the first flow amount is substantially equivalent to the amount of sealant material that has been dispensed from the syringe 401. Accordingly, the difference between the sum of intermediate flow amounts and the second flow amount corresponds to the amount of remaining dispensing material 410. In other words, by comparing the sum of intermediate flow amounts determined by the detecting unit 407 with respect the second flow amount, a residual quantity of the dispensing material 410 remaining in the syringe 401 can be determined. The controller 408 controls the gas supply unit 405, the valve 406 provided at the gas pipe 404 and the detecting unit 407 to supply a gas or cut off supplying of the gas for a predetermined time to the syringe 401 filled with the dispensing material 410, so that a dispensing may be performed on the substrate 400 while the detecting unit 407 may detect the sum of intermediate flow amounts between the first flow amount and the third flow amount.

The dispenser for a liquid crystal display panel in accordance with the embodiment of the present invention may be adopted to form a seal pattern, a liquid crystal layer or an Ag (Sliver) dot. First, the case of forming a seal pattern on the substrate 400 will now be described in detail. The syringe 401 is filled with a sealant as the dispensing material 410, to which a first flow amount of gas is supplied through the gas supply unit 405 while the detecting unit 407 detects a first flow amount of gas. An intermediate flow amount of gas is then supplied to the syringe 401 through the gas supply unit 405 such that an appropriate quantity of sealant is dispensed to form a seal pattern on the substrate 400 and the detecting unit 407 detects the intermediate flow amount of gas. The seal pattern may be opened at some portion to form a pattern having a function as a liquid crystal injection opening or may be formed in a closed pattern encompassing an outer edge of the image display region.

The substrate 400 may be a large-scale mother substrate formed of glass on which a plurality of thin film transistor array substrates are formed, or a large-scale mother substrate on which a plurality of color filter substrates are formed. Either the table with the substrate 400 loaded thereon or the syringe 401 applying the sealant is horizontally moved to change their relative position to thereby form a seal pattern at an outer edge of the image display part of the substrate 400. If the syringe 401 is moved, a foreign material may be generated due to driving of the dispenser where the syringe 401 is mounted. Such foreign material can be adsorbed by the substrate 400. Therefore, it is preferable that the table with substrate 400 loaded thereon is horizontally moved in forward/backward and left/right direction to form the seal pattern.

Gas is supplied through the gas supply unit 405 to the syringe 401 so that sealant is consumed to form the seal pattern, and the detecting unit 407 detects the intermediate flow amount of gas. Then, the sum of intermediate flow amounts of gas is checked to see how much residual sealant remains in the syringe 401. For example, the second flow amount corresponding to a quantity of sealant dispensings initially available in the syringe is equally divided into a plurality of values, such as 100. The sum of intermediate flow amount of gas is checked to see which level of the range divided into 100 has been reached to thereby precisely determine the residual number of sealant dispensings that can be further performed by the syringe 401.

The dispenser and the method for determining a residual quantity of a dispensing material or number of dispensings remaining by using the dispenser in accordance with the embodiments of the present invention for dispensing a sealant pattern have the following advantages. The residual quantity of sealant or number of dispensings remaining in the syringe 401 may be precisely measured to prevent sealant waste and malformation of sealant during a dispensing. Further, an operator can be kept informed of the amount of sealant available such that a syringe that just became insufficient can be replaced with a new syringe fully filled with sealant when needed. Accordingly, material costs may be reduced and factors causing a bad seal pattern or no seal pattern can be prevented. Thus, the defect rate of the liquid crystal display panel can be reduced to improve productivity.

In another embodiment of the present invention, a liquid crystal layer may be formed on the substrate 400 by using a dispenser for the liquid crystal display panel. The method for forming the liquid crystal layer on the liquid crystal display panel is roughly divided into a vacuum injection method and a dropping method. First, the vacuum injection method is done using a liquid crystal injection opening of a unit liquid crystal display panel, separated from a large-scale mother substrate, which is put in a container filled with liquid crystal in a chamber in which a certain vacuum is set. Then, liquid crystal is injected into the liquid crystal display panel according to a pressure difference between an inner side and an outer side of the liquid crystal display panel by varying a vacuum degree. After the liquid crystal is filled in the liquid crystal display panel, the liquid crystal injection opening is sealed to form the liquid crystal layer of the liquid crystal display panel.

The vacuum injection method as described above has the following problems. First, it takes a long time to fill the liquid crystal into the liquid crystal display panel. In general, the attached liquid crystal display panel with an area of several hundreds cm² has a gap of a few μms (micrometers). Thus, even with the vacuum injection method, which uses pressure difference, the injection of liquid crystal takes a long time. For instance, in the case of fabricating a liquid crystal display panel of about 15 inches, it takes 8 hours to fill the liquid crystal display panel with liquid crystal. Thus, because such a long time is taken during the fabrication of the liquid crystal display panel, the productivity is degraded. In addition, as the liquid crystal display panel increases in size, the time required for filling liquid crystal correspondingly increases and thus filling deficiency of liquid crystal further occurs. Therefore, the vacuum injection method can hardly cope with the large-scale liquid crystal display panel.

Another problem with the vacuum injection method is that too much liquid crystal is consumed. In general, the actually injected quantity of liquid crystal in the vacuum injection method is very small compared to the quantity of liquid crystal filled in the container. When liquid crystal is exposed in the air or to a specific gas, it reacts with the gas and degrades. Thus, even if liquid crystal in a container is filled into a plurality of liquid crystal display panels, a large quantity of liquid crystal remaining after the filling has to be discarded, which increases the overall unit price of the liquid crystal display and thus decreases price competitiveness. In order to overcome such problems of the vacuum injection method, a dropping method is proposed.

The dropping method is that liquid crystal is dropped and dispensed on a plurality of thin film transistor array substrates fabricated on one large-scale mother substrate or on color filter substrates fabricated on another large-scale mother substrate by using a dispenser in accordance with the present invention. The two mother substrates are then attached to each other so that liquid crystal is uniformly distributed at the entire image display regions by the attaching pressure, thereby forming a liquid crystal layer. In the dropping method, liquid crystal may be dropped within a short time compared to the vacuum injection method, and even though the liquid crystal display panel is large in size, the liquid crystal layer may be quickly formed. In addition, since only enough liquid crystal is dropped as required, the increase in the unit price of the liquid crystal display panel as in the vacuum injection method due to the expensive liquid crystal being discarded is prevented such that price competitiveness is increased. Unlike the vacuum injection method, the dropping method using the dispenser according to embodiments of the present invention can be performed prior to separating unit liquid crystal display panels from the large-scale mother substrate.

In the case of dropping liquid crystal on the substrate through the dropping method, a dispenser in accordance with the embodiment of the present invention for dropping the liquid crystal can be used. That is, the syringe 401 is filled with liquid crystal as the dispensing material 410, to which a gas is supplied through the gas supply unit 405, and the detecting unit 407 detects a first flow amount of gas. An intermediate amount of gas is supplied to the syringe 401 such that an appropriate quantity of liquid crystal is dispensed. The detecting unit 407 detects the intermediate amounts of gas and determines the sum of intermediate amounts of gas up to a second flow amount of gas. By supplying the gas through the gas supply unit 405 to the syringe 401 at the intermediate flow amount, an appropriate amount of the liquid crystal filled in the syringe 401 is dropped on the substrate 400.

The substrate 400 may be a large-scale mother substrate formed of glass on which a plurality of thin film transistor array substrates are formed, or a large-scale mother substrate on which a plurality of color filter substrates are formed. Either the table with the substrate 400 loaded thereon or the syringe 401 applying liquid crystal is horizontally moved to change relative position relation, and liquid crystal is dropped on the image display part of the substrate 400. At this time, if the syringe 401 is moved, a foreign material may be generated due to driving of the dispenser where the syringe 401 is mounted and adsorbed on the substrate 400. Therefore, preferably, the table with substrate 400 loaded thereon is horizontally moved in forward/backward and left/right direction to drop the liquid crystal.

Gas is supplied through the gas supply unit 405 to the syringe 401 so that liquid crystal is consumed in dispensing the liquid crystal, and the detecting unit 407 detects the intermediate flow amounts of gas. Then, the sum of intermediate flow amounts of gas is checked to see how much residual liquid crystal. For example, the second flow amount corresponding to a quantity of liquid crystal dispensing initially available in the syringe is equally divided into a plurality of values, such as 100. The sum of intermediate flow amount of gas is checked to see which level of the range divided into 100 has been reached to thereby precisely determine the residual number of liquid crystal dispensings that can be further performed by the syringe 401.

The dispenser and the method for detecting a residual quantity of a dispensing material using the dispenser in accordance with the embodiment of the present invention for dispensing liquid crystal has the following advantages. The residual quantity of liquid crystal remaining in the syringe 401 can be precisely measured and/or determined. A case where the syringe is replaced with a new one even though sufficient liquid crystal remains in the syringe may be prevented so that expensive liquid crystal is not wasted. Further, the case where a liquid crystal layer is not completely formed because an insufficient amount of liquid crystal remains in the syringe 401 may be also prevented. Thus, the defect rate of the liquid crystal display panel is reduced, which improves productivity.

Figure 6:
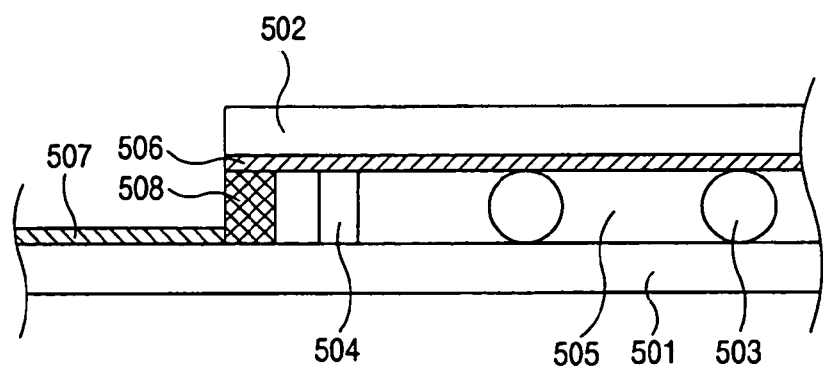
FIG. 6 illustrates a sectional structure of one edge of the liquid crystal display panel.

In another embodiment, an Ag (Silver) dot may be formed on the substrate 400 by using the dispenser for a liquid crystal display panel in accordance with the embodiment of the present invention. FIG. 6 illustrates a sectional structure of one edge of the liquid crystal display panel. With reference to FIG. 6, a liquid crystal display panel is formed such that a thin film transistor array substrate 501 and a color filer substrate 502 are attached in a facing manner with a certain gap by a spacer 503 and a seal pattern 504. A liquid crystal layer 505 is formed in the gap between the thin film transistor array substrate 501 and the color filter substrate 502. The thin film transistor array substrate 501 is formed having a protruded portion as compared to the color filter substrate 502, and at the protruded portion, a gate pad part connected to gate lines of the thin film transistor array substrate 501 and a data pad part connected to data lines are formed.

In the image display part of the thin film transistor array substrate 501, gate lines to which a scan signal is applied from outside through the gate pad part and data lines to which image information is applied through the data pad part are arranged to cross each other, and a plurality of thin film transistors for switching the liquid crystal cells is formed at each of the crossings of the gate lines and the data lines. In addition, a plurality of the pixel electrodes connected to the thin film transistors are separately formed at cell regions.

In the image display part of the color filter substrate 502, color filters are formed in each of the cell regions that are separated by a black matrix. A common transparent electrode for driving the liquid crystal layer together with the pixel electrodes formed on the thin film transistor array substrate 501 is also formed on the color filter substrate 502. A common voltage line 507 for applying a common voltage to the common electrode 506 formed on the color filter substrate 502 is formed on the thin film transistor array substrate 501. An Ag dot 508 is formed either on the thin film transistor array substrate 501 or the color filter substrate 502 to electrically connect the common voltage line 507 and the common electrode 506, so that the common voltage applied to the common voltage line 507 can be applied to the common electrode 506 by way of the Ag dot 508.

At least one or more Ag dots 508 are formed at each of the plurality of unit liquid crystal display panels fabricated on the large-scale mother substrate, which can be formed by using the dispenser in accordance with embodiments of the present invention. The syringe 401 is filled with Ag as the dispensing material 410, to which a gas is supplied through the gas supply unit 405, and the detecting unit 407 detects a first flow amount of gas. An intermediate amount of gas is supplied to the syringe 401 such that a minimum quantity of Ag is dispensed to form an Ag dot 508 on the substrate 400. The detecting unit 407 detects the intermediate amounts of gas and determines the sum of intermediate amounts of gas up to a second flow amount of gas. The substrate 400 may be a large-scale mother substrate made of glass on which a plurality of thin film transistor array substrates are formed, or a large-scale mother substrate on which a plurality of color filter substrates are formed.

Either the table with the substrate 400 loaded thereon or the syringe 401 applying Ag is horizontally moved to change the relative position between the substrate 400 and the syringe 401. The Ag dot 508 is formed at an outer edge of the image display part of the substrate 400. At this time, if the syringe 401 is moved, a foreign material may be generated due to driving of the dispenser where the syringe 401 is mounted and adsorbed on the substrate 400. Therefore, preferably, the table with substrate 400 loaded thereon is horizontally moved in forward/backward and left/right direction to form the Ag dot 508.

An intermediate flow amount of gas is supplied through the gas supply unit 405 to the syringe 401 so that Ag material is consumed in dispensing the Ag dot 508, and the detecting unit 407 detects the intermediate flow amounts of gas. Then, the sum of intermediate flow amounts of gas is checked to see how much Ag remains. For example, the second flow amount corresponding to a quantity of Ag dot dispensing initially available in the syringe is equally divided into a plurality of values, such as 100. The sum of intermediate flow amounts of gas is checked to see which level of the range divided into 100 has been reached to thereby precisely determine the residual number of Ag dot dispensings that can be performed by the syringe 401.

The dispenser and the method for detecting a residual quantity of a dispensing material using the dispenser in accordance with the embodiment of the present invention for Ag dots has the following advantages. The residual quantity of Ag remaining in the syringe 401 may be precisely determined and/or measured. Thus, a case where the syringe is replaced with a new one even though sufficient Ag remains can be prevented such that a waste of material is prevented. Further, a case in which an Ag dot 508 is not formed on the substrate 400 because insufficient Ag remains in the syringe 401 can also be prevented. Thus, the defect rate of the liquid crystal display panel can reduced, such that productivity is improved.

As so far described, the dispenser for a liquid crystal display panel and a method for detecting a residual quantity of a dispensing material using the dispenser in accordance with the embodiment of the present invention have the following advantages. On the basis of the volume change of the space in the syringe which is not filled with any dispensing material, the first gas flow amount when a dispensing material is filled in the syringe is detected and the second gas flow amount when such a minimum quantity of dispensing material as to be dispensable remains in the syringe is detected, which are compared with the sum of intermediate gas flow amounts when the dispensing material is consumed according to dispensing, thereby precisely measuring a residual quantity of the dispensing material remaining in the syringe. Therefore, the case where a syringe, which has sufficient dispensing material is replaced with a new syringe filled with the dispensing material may be prevented. Thus, a material cost may be minimized and a production unit cost of a product is reduced so that price competitiveness may be improved. In addition, the case where a defective dispensing possibly occurs due to an insufficient dispensing material remaining in the syringe can be prevented. Thus, a defect rate of the liquid crystal display panel can be reduced such that the productivity can be improved.

It will be apparent to those skilled in the art that various modifications and variations can be made in the dispenser for liquid crystal display panel and method for detecting residual quantity of dispensing material using the same of the present invention without departing from the spirit or scope of the inventions. Thus, it is intended that the present invention covers the modifications and variations of this invention provided they come within the scope of the appended claims and their equivalents.

What is claimed is:

1. A method for forming a liquid crystal display panel comprising:
   providing a first substrate and a second substrate, the first substrate including a plurality of thin film transistors, pixel electrodes, and a common voltage line, the second substrate including a color filter layer and a common electrode;
   loading the first substrate having a plurality of panel regions on a table;
   providing a dispenser having syringe;
   determining a first flow amount of gas by supplying a gas to a syringe filled with a silver, wherein the first flow amount of gas is the amount of gas necessary for the syringe to be capable of dispensing in response to an additional amount of gas;
   determining a second flow amount of gas by supplying the gas to the syringe, wherein the second flow amount of gas is the amount of gas such that the syringe is filled with the minimum quantity of residual silver that is enough to ensure a previous dispensing but not enough for a subsequent;
   repeatedly dispensing the silver using the syringe filled with the silver onto the common voltage line of the first substrate by supplying intermediate flow amounts of gas to the syringe and moving the table on which the first substrate is loaded;
   detecting the intermediate amounts of gas corresponding to the dispensed amount of the silver in the syringe; and
   determining a residual quantity of the silver remaining in the syringe by comparing the sum of the intermediate amounts of gas with the second flow amount of the gas; and
   connecting the common voltage line of the first substrate and the common electrode of the second substrate through the silver;
   wherein the silver is still dispensed if the sum of the intermediate amounts of gas is less than the second flow amount of the gas.

* * * * *